(12) United States Patent
Mansfield (10) Patent No.: US 6,693,996 B2
(45) Date of Patent: Feb. 17, 2004

(54) SYSTEM AND METHOD FOR DATA BACKUP IN A HOME NETWORK TELEPHONE

(75) Inventor: Carl Mansfield, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 127 days.

(21) Appl. No.: 10/066,487

(22) Filed: Jan. 31, 2002

(65) Prior Publication Data

US 2003/0035522 A1 Feb. 20, 2003

Related U.S. Application Data (60) Provisional application No. 60/312,367, filed on Aug. 14, 2001.

(51) Int. Cl.[7] .............................................. H04M 11/00
(52) U.S. Cl. .................................................. 379/90.01
(58) Field of Search ........................ 379/90.01, 93.08, 379/93.01, 93.05, 93.06, 93.14, 93.15, 93.28, 93.31

(56) References Cited

U.S. PATENT DOCUMENTS

| | | | |
|---|---|---|---|
| 5,375,163 A | | 12/1994 | Kamimoto et al. .......... 455/464 |
| 6,167,120 A | * | 12/2000 | Kikinis ..................... 379/90.01 |
| 6,314,502 B1 | * | 11/2001 | Piersol ........................ 711/162 |
| 2002/0013723 A1 | * | 1/2002 | Mise ............................. 705/8 |

* cited by examiner

Primary Examiner—Stella Woo
(74) Attorney, Agent, or Firm—David C. Ripma; Matthew D. Rabdau (57) ABSTRACT

A Home Network telephone system and method are provided for backing up user data. The system comprises at least one endpoint to transceive telephone communications. The endpoints can be devices such as telephones or fax machines, for example. The system also comprises a gateway to service and transceive telephone communication with the endpoints. The gateway has a memory to store a copy of user data associated with each endpoint. The gateway stores user data such as telephone directories, calling line ID (CLID) lists, call-logs, and user preferences for organizing the stored data. The gateway can supply the endpoints with an initial start-up configuration of user data, or resupply an endpoint in response to the endpoint losing the copy of the user data stored in its local memory. Each endpoint receives the user data from the gateway and stores a copy of the user data in a local memory. Conversely, the endpoint has a user interface to generate user data and store the user data in local memory, and the gateway stores a copy of the user data generated by the endpoint in the gateway memory. More specifically, the gateway uses a control channel to receive a copy of the user data from an endpoint, and sends an acknowledgement to the endpoint that the user data has been received. When an endpoint modifies the user data, the control channel is used to send a copy of the modified user data to the gateway. Likewise, the endpoint uses a control channel to request user data from the gateway, in the event of battery failure, for example.

36 Claims, 8 Drawing Sheets

Fig. 1

Fig. 3  INITIAL CONFIGURATION

Fig. 4  DATA RECOVERY

Fig. 5 USER DATA BACKUP

Fig. 9

Fig. 7A
GW STATE MACHINE

Fig. 7C

SYSTEM AND METHOD FOR DATA BACKUP IN A HOME NETWORK TELEPHONE

CROSS-REFERENCE TO RELATED APPLICATION

This application claims the benefit of U.S. Provisional Application No. 60/312,367, filed Aug. 14, 2001.

BACKGROUND OF THE INVENTION

1. Field of the Invention

This invention generally relates to Home Network telephone systems and, more particularly, to a system and method for backing up endpoint user data in a Home Network telephone system.

2. Description of the Related Art

Currently, there are a number of cordless telephone products that can store many kinds of user data in the cordless handset. For example, the following types of user data can be stored:

Telephone Directories;

Incoming calling line ID (CLID) lists; and,

User preference configurations.

A typical cordless telephone can suffer from power failure due to the internal rechargeable battery losing its charge. Unless a nonvolatile memory is used, user data such as that listed above is lost when the battery is discharged. Conventionally, this problem is solved by including either additional battery back-up (e.g. a button battery) or by storing the user data in nonvolatile memories. Since nonvolatile memories can be expensive, sometimes only portions of the user data is stored, and thereby protected from loss when the battery is discharged. For example, some telephones do not protect the CLID list in nonvolatile memory, in order to save cost. This implies that when the battery is discharged, any previously incoming CLID data is forever lost.

It would be advantageous if cordless telephone user data could be saved from battery failure.

It would be advantageous if an endpoint in a Home Network telephone system could be resupplied with stored user data in the event of an endpoint battery failure.

It would be advantageous if an endpoint in a Home Network telephone system could be supplied with initial configuration user data upon initial start up.

SUMMARY OF THE INVENTION

This invention provides a method for user data to be recovered for a Home Network telephone system endpoint after a battery is discharged, without the need for storage of the data in a local (endpoint) nonvolatile memory. It does this for a Home Network system by using a residential gateway (GW) and data connectivity with the residential GW. A copy of the user data is stored at the GW and can be recovered and transferred back to the endpoint after loss due to battery discharge.

In this invention, the existing memory space inside the residential GW is used to store a mirrored copy of the entire user data of any Home Network Telephony device (endpoint) connected to the gateway. If the data is lost, its copy is recovered from the GW and restored in the Home Network device.

Accordingly, a Home Network telephone system is provided for backing up user data. The system comprises an endpoint to transceive telephone communications. Typically, a plurality of endpoints exist. The endpoints can be devices such as telephones or fax machines, for example. The system also comprises a gateway to service and transceive telephone communications with the endpoints. The gateway has a memory to store a copy of user data associated with each endpoint. The gateway stores user data such as telephone directories, calling line ID (CLID) lists, call-logs, and user preferences for organizing the stored data or other endpoint features such as loudness and ring style.

Optionally, the gateway supplies the endpoints with an initial start-up configuration of user data. The gateway also resupplies an endpoint in response to the endpoint losing user data stored in its local memory. An endpoint that has lost its local memory receives the user data from the gateway, and stores a copy of the user data in a local memory. Conversely, the endpoint has a user interface to generate user data and store the user data in local memory, and the gateway stores a copy of the user data generated by the endpoint in the gateway memory for backup.

More specifically, the gateway uses a control channel to receive a copy of the user data from an endpoint, and after receiving the data, sends an acknowledgement to the endpoint. Then, the user data received from the endpoint is stored in gateway memory. In another aspect of the system, the endpoint periodically transmits user data to the gateway for backing up and the gateway updates stored user data in response to the periodic transmissions from the endpoint.

When an endpoint modifies the user data, the control channel is used to send a copy of the modified user data to the gateway. Likewise, the endpoint uses a control channel to request user data from the gateway, in the event of battery failure, for example.

Additional details of the above-described home telephone network backup system, and a method for backing up user data in a Home Network telephone system, are described below.

DETAILED DESCRIPTION OF THE PREFERRED EMBODIMENTS

Figure 1:
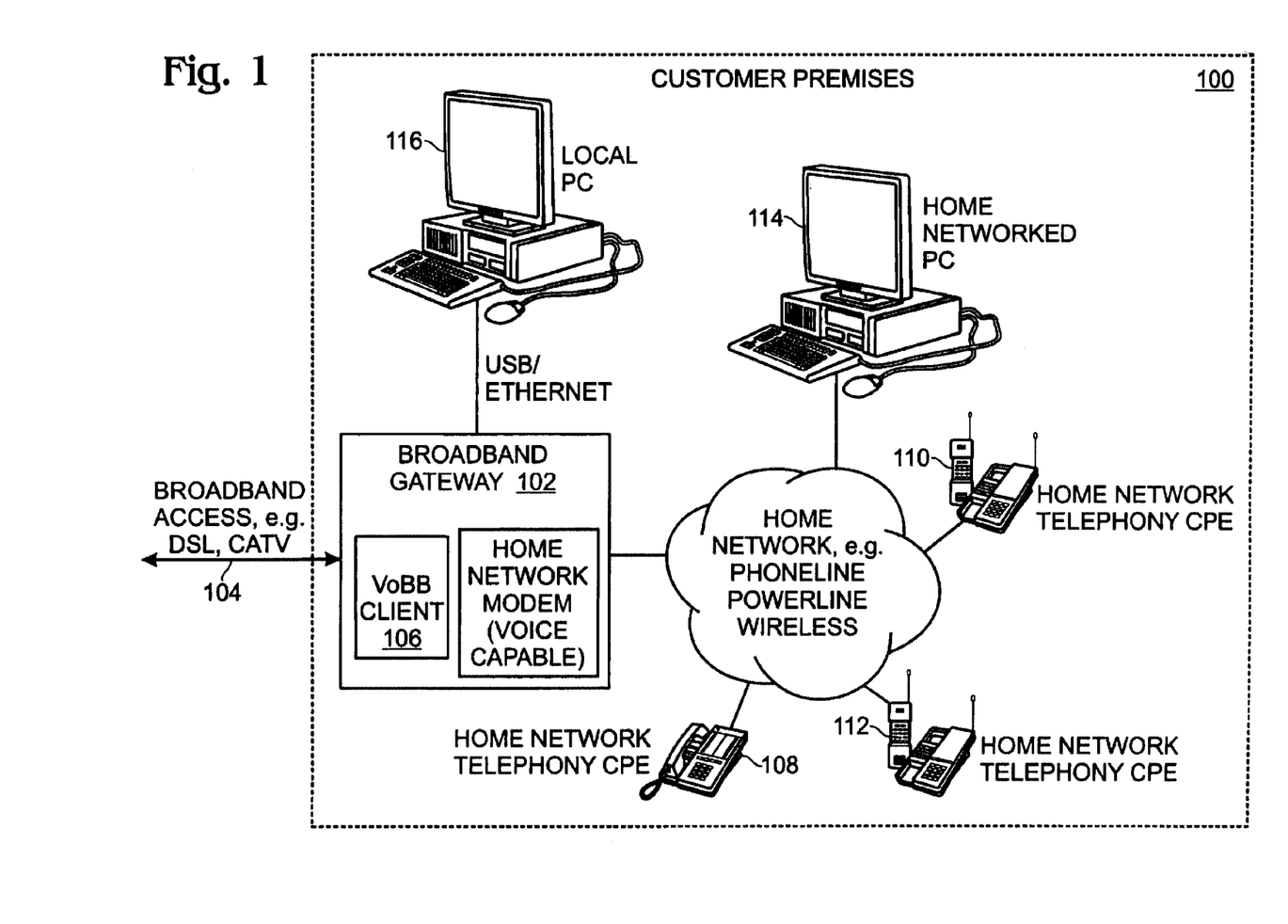
FIG. 1 is a schematic block diagram illustrating a Home Network telephone system.

FIG. 1 is a schematic block diagram illustrating a Home Network telephone system 100. Home Network telephony products, or endpoints are being developed that can access emerging voice over Broadband (VoBB) services, such as voice over Internet protocol (VoIP), voice over DSL (VoDSL), voice over cable modem (VoCM), or the like, in conjunction with a VoBB enabled residential gateway (GW) 102.

The broadband GW 102 is the entry point of a broadband access service to the system 100 on line 104, such as DSL, or cable Modem service. This gateway 100 supports VoBB service by integrating a VoBB client 106 where the VoBB service is terminated. The GW 102 can distribute the VoBB service to Home Networking telephony endpoints 108, 110, and 112 inside the home via a Home Networking technology capable of supporting voice services, with sufficient quality of service (QoS). The interface between the gateway 102 and the endpoints can be via the AC powerline, a hardwired phoneline, other hard-wired transmission media such as Ethernet, wirelessly, or combinations of the above. Phonelines are desirable since they already exist in so many home and office environments and are conventionally used for telephone service.

The Home Network telephony devices 108–112, referred to herein as endpoints, can access derived voice service (VoBB) via the home gateway 102 using a telephony protocol, that will be referred to herein as voice over Home Network (VoHN). The communications path between the endpoint 108–112 and the gateway 102 is intrinsically digital with the voice data carried in digitized format. In addition to a voice channel(s), it is possible to carry additional, non-voice data between the endpoint and the gateway in an out-of-band digital channel.

The gateway 102 is typically permanently connected to AC power, and can store large quantities of data in internal memories. Typically, the gateway 102 also includes a large nonvolatile memory that protects internal data from loss during power failure. If the GW 102 does not have nonvolatile memory internally, another approach to protecting critical data is to store it in a locally connected PC 116. Alternately, the data can be stored at an endpoint with a sufficient memory, such as the endpoint PC 114. After loss due to power-failure, the critical data in the gateway can be restored from the PC 114 or 116.

Figure 2:
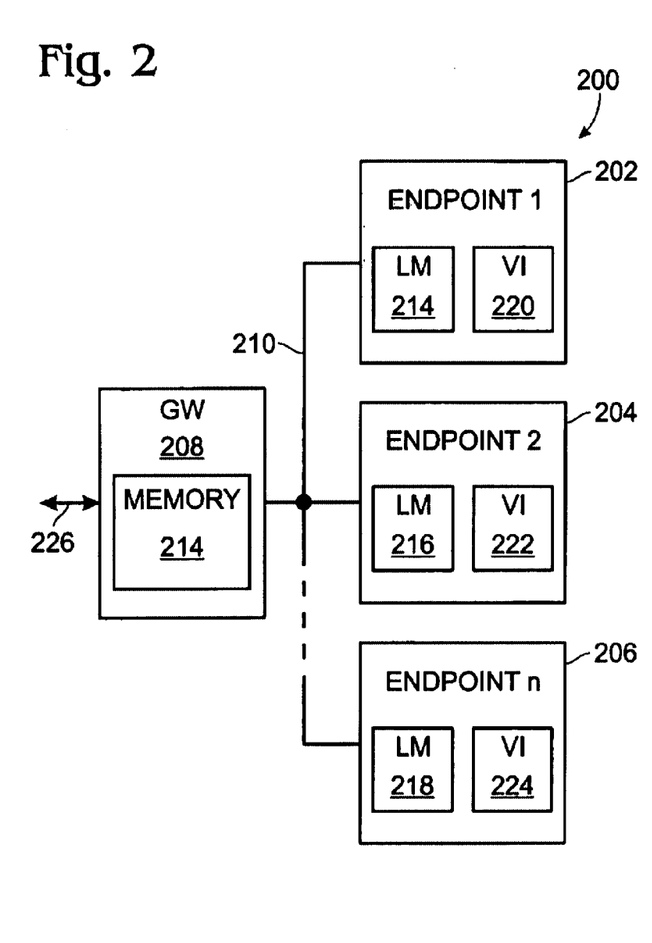
FIG. 2 is a schematic block diagram of the present invention Home Network telephone system for backing up user data.

FIG. 2 is a schematic block diagram of the present invention Home Network telephone system for backing up user data. The system 200 of FIG. 2 is a more detailed depiction of the system 100 of FIG. 1. The system 200 comprises at least one endpoint having a port to transceive telephone communications via the VoHN system. Shown are endpoint 1 (202), endpoint 2 (204), and endpoint n (206). However, it should be understood that the system 200 is not limited to any particular number of endpoints. The endpoints 202–206 can be hardwired devices, wireless devices, telephones, fax machines, computers, multifunctional peripherals (MFPs), or video telephones to name just a few possible communication devices.

The system 200 also comprises a gateway 208 having a port on line 210 to transceive telephone communication with the endpoints 202–206. As used herein, the "line 210" represents a transmission medium that can be a hardline or wireless medium, as mentioned in the description of FIG. 1, above. Also as mentioned above in the description of FIG. 1, the gateway 208 has a memory 212 to store a copy of user data associated with each endpoint. The gateway 208 establishes a unique identifier for each endpoint and stores the user data cross-referenced to endpoint identifiers. For example, the identifier can be a local link, MAC, or network address.

The gateway 208 supplies the user data to the endpoints primarily in response to two situations. One situation is the initial start-up configuration of user data to an endpoint, before the endpoint has had an opportunity to be more personally configured through use, or more directly through user selected options. The other situation is resupplying an endpoint in response to the endpoint losing the copy of the user data stored in its local memory. Note that the gateway need not necessarily support both operations. In either case, each requesting endpoint 202–206 receives the user data from the gateway 208 and stores a copy of the user data, respectively, in local memories (LMs) 214, 216, and 218. Note that not all endpoints in the system need be enabled with the present invention capacity to request, access, and upload user data backed up in the gateway 102.

Typically, the user data is something that is generated or modified in response to the usage of an endpoint. For example, the user data can result from a call-log of endpoint activity—making and receiving to and from a tracked list of external telephone numbers. Alternately, the user data may be information that is entered by a user at the endpoint using an endpoint user interface, such as a keypad, voice recognition software, and a display. The endpoints 202–206 have user interfaces (UIs) 220, 222, and 224, respectively, to generate or modify user data. Each endpoint 202–206 stores the generated user data in its respective local memory 214–218. Likewise, the endpoints 202–206 send, and the gateway 208 stores, a back-up copy of the user data generated or modified by each endpoint 202–206 in the gateway memory 212.

The gateway 208 has a port on line 226 for transceiving calls on an external telephone line that communicates call information in a first format, for example VoBB (this aspect of the invention is more clearly detailed in FIG. 1). Typically, the external line is associated with an external telephone network. The gateway 208 converts between the first format and a digital Voice over Home Network format (VoHN). The gateway 208 establishes traffic channels to communicate information in the Home Network format on line 210 and establishes a control channel on line 210 to manage storage and supply of the user data.

For each endpoint 202–206 in the system 200 that supports the back-up capability, the gateway 208 stores user data such as telephone directories, calling line ID (CLID) lists, call-logs, and user preferences for organizing the stored data,. For example, the gateway 208 may store backup copies of a private phone directory associated with endpoint 1 (202) that may include twenty telephone number cross-referenced to names or businesses. The gateway may also store a back-up copy of CLID lists for endpoint 2 (204). The CLID list may be a list of user-friendly descriptors that may be displayed at an endpoint in response to the endpoint identifying a CLID from a selected group of telephone numbers cross-referenced to descriptors. The back-up data can be a list of external telephone numbers calling a particular endpoint, or the external telephone numbers being called from a particular endpoint. Finally, the back-up data may include user preferences such as "collect call-log data for dialed telephone numbers only", the device loudness setting, the style or tune associated with the ring, or any number of features that are conventionally configured by a cell phone or cordless phone user. The above examples are but a few types of user data that can be stored at the gateway. The invention is not limited to any particular type of user data.

Generally, the endpoints 202–206 use the control channel on line 210 to request user data from the gateway 208. After receiving the copy of the user data from the gateway 208, an acknowledgement is sent to the gateway 208 that the user data has been received and correctly installed in the endpoint local memory. In some aspects, the gateway 102 resends the data until an acknowledgement is received, or resends the data a predetermined number of attempts.

An endpoint can lose its copy of user data stored in local memory. For example, if endpoint 1 (202) loses the user data in local memory 214, the endpoint 202 uses a control channel to request user data from the gateway 208, and sends an acknowledgement to the gateway 208 in response to receiving a copy of the user data from the gateway 208.

Figure 3:
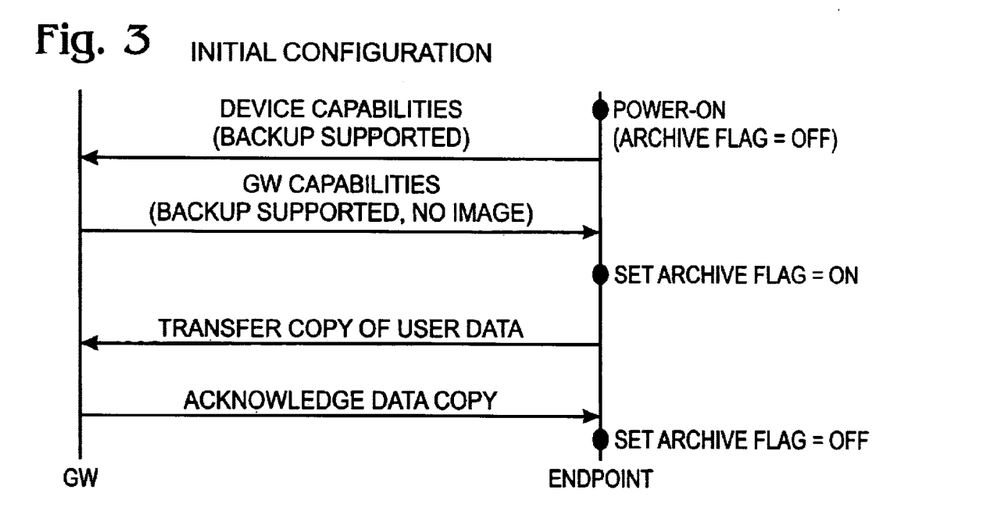
FIG. 3 is a diagram illustrating initial configuration control channel communications for the system of FIG. 2.

FIG. 3 is a diagram illustrating initial configuration control channel communications for the system of FIG. 2. Before the transfer of user data, either to or from the gateway, the endpoints use the control channel to inquire if the gateway supports user data backup functions. An endpoint must determine the available Home Network interface options upon initialization. The gateway uses the control channel to communicate to endpoints that the backup function is supported.

In some aspects, the endpoint uses a control channel to inquire if the gateway supports user data backup functions. The gateway uses a control channel to send communications to the endpoint that the backup function is supported, but that no user data is stored for the first endpoint. The endpoint now has an opportunity to establish a backup user data file at the gateway. The endpoint then sets an archive flag to the "on" position, communicates endpoint user data to the gateway for backup, and sets the archive flag to the "off" position in response to receiving an acknowledgement from the gateway.

In some aspects of the system, the data downloaded to the gateway at initialization is an initial configuration data pre-loaded in the local memory of the initializing endpoint. For example, when the endpoint is turned on for the first time out of the box. Alternately, the data is generated through the endpoint user interface. In other aspects, the endpoint may have a local memory full of useful user data as a result of operating in a different telephone system. After transmission of this initial data to the gateway, the gateway uses the control channel to send an acknowledgement that the user data has been received. The endpoints set the archive flag to the "off" position in response to receiving the acknowledgement.

In some aspects of the system, the gateway stores a generic user data configuration for endpoints in the gateway memory and uses the control channel to communicate the generic user data configuration to the first endpoint. Most commonly, the generic user data is supplied to an endpoint upon initial start-up. The initial configuration to be stocked in the local memory may be generic user data is useful when the endpoint local memory is not pre-loaded with configuration information. Such an initial configuration may be useful for users who do not care to customize their options, or where a device's initial configuration is dependent upon the service provider. The initial configuration may be adequate for other users until they have the opportunity to modify and/or generate their own personal configuration data. After loading the initial configuration into the endpoint local memory, the gateway stores a backup copy of any modifications made to the generic user data.

Figure 4:
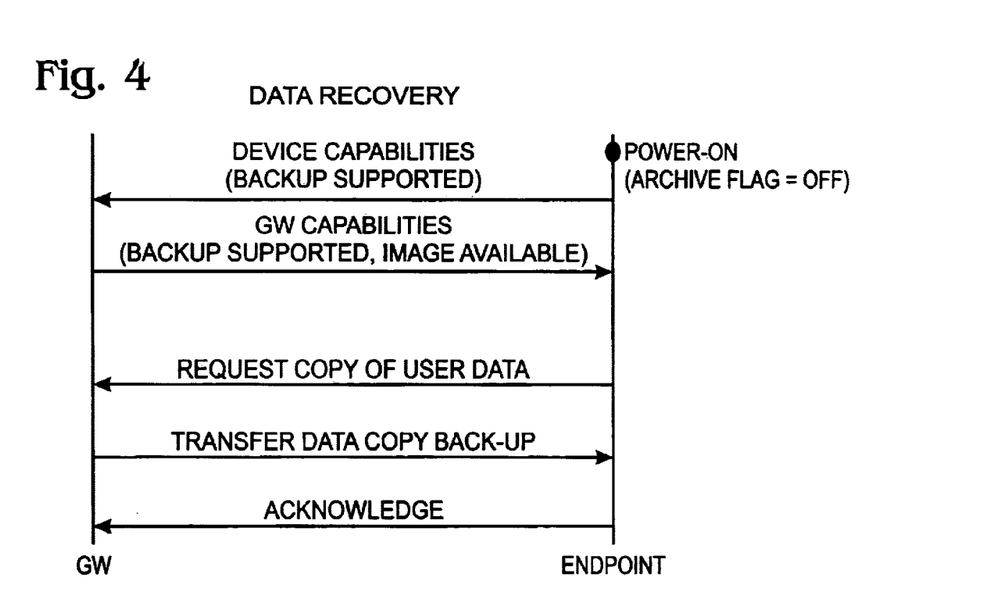
FIG. 4 is a diagram illustrating data recovery control communications for the system of FIG. 2.

FIG. 4 is a diagram illustrating data recovery control communications for the system of FIG. 2. In a data recovery scenario, an endpoint powers up after its copy of user data stored in local memory has been lost, and uses the control channel to inquire if the gateway supports user data backup functions. The gateway uses the control channel to send communications that the backup function is supported, and that user data has been stored (images available) for the endpoint. The endpoint uses the control channel to receive the stored user data from the gateway and sends an acknowledgement.

In some aspects of the system, the gateway does not necessarily store a backup copy of the user information that is being generated and stored in local memory at the endpoint. Then, the gateway stores a generic user data configuration for endpoints in the gateway memory and uses the control channel to communicate the generic user data configuration to the first endpoint in response to a request from an endpoint.

Figure 5:
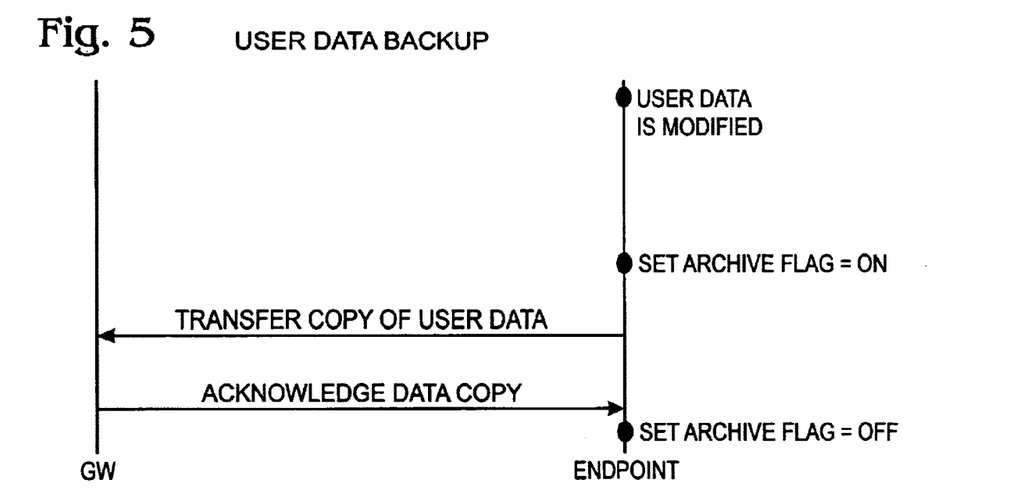
FIG. 5 depicts user data back-up control channel communications for the system of FIG. 2.

FIG. 5 depicts user data back-up control channel communications for the system of FIG. 2. These communications depict the transfer of user data from an endpoint to the gateway. The gateway receives a copy of the user data from the endpoint through the control channel, sends an acknowledgement to the endpoint that the user data has been received, and stores the user data received from the endpoint. In another aspect of the system, the endpoint modifies the user data, uses a control channel to set an archive flag to the "on" position, and sends a copy of the modified user data to the gateway. Then, the gateway uses the control channel to send an acknowledgement to the first endpoint that the modified user data has been received.

In another aspect of the invention, each endpoint periodically transmits user data to the gateway for backing up, and the gateway updates stored user data in response to the periodic transmissions from the endpoints. This aspect of the system advantageously attempts to keep the user data backup file current. The disadvantage is that periodic backup operation necessarily includes a built-in time delay between updates. If the battery fails after a change in the user data, but before the regular update, this change cannot be recovered. Alternately, the user data is backed up is response to endpoint interface prompts, or automatically in response to usage or events. For example, the backup user data file in the gateway can be updated at the completion of a call.

Figure 6:
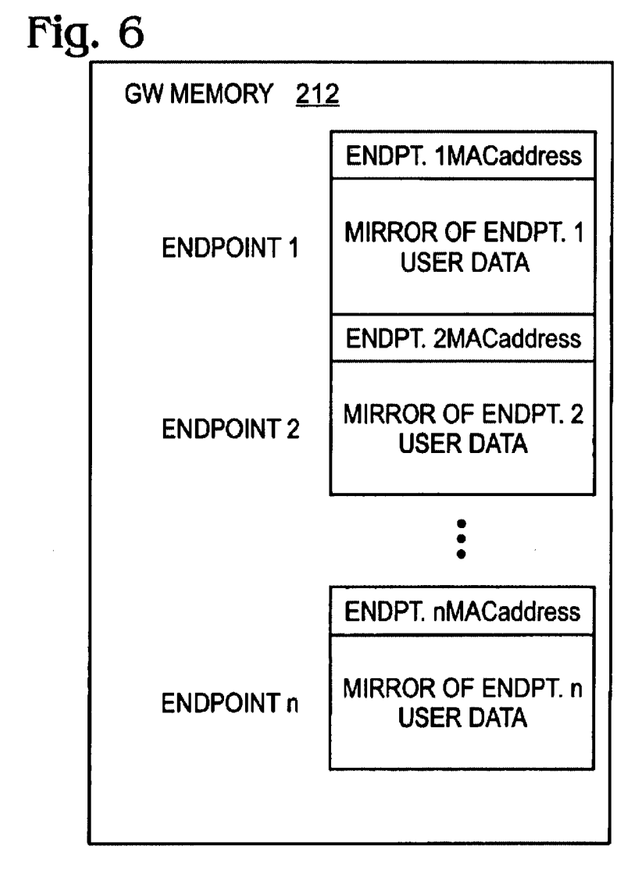
FIG. 6 is a diagram illustrating the gateway memory of FIG. 2 in greater detail.

FIG. 6 is a diagram illustrating the gateway memory 212 of FIG. 2 in greater detail. The present invention system uses existing memory space inside the residential GW to store a mirrored copy of the entire user data of any endpoint. If the endpoint loses the data, its copy is recovered from the GW and restored in the device. At the gateway, copies of the endpoint's data can be stored in many possible formats. The data is indexed by an endpoint identifier, such as a Home Network MAC address. The use of a MAC address, or equivalent, to index the mirrored data is required as there can be more than one endpoint with user data stored in the GW.

FUNCTIONAL DESCRIPTION

As explained above in the description of FIG. 3, at power-up the endpoint sends a capabilities message to the GW, which responds with a similar message. If the GW indicates it does not support the local memory backup feature, no further action is taken. However, if the GW indicates that backup is supported and "no image" (user data) is stored, an initial configuration is required, as the GW does not have any backup data for this endpoint. When this happens, the endpoint sets its archive flag to "on". With the archive flag in the "on" state, the endpoint attempts to send a copy of its user configuration data to the GW. The GW acknowledges this, indicating that a backup of the user data has been successfully stored. When the endpoint receives this acknowledgement, it sets its archive flag to "off", indicating that the current memory of the endpoint is backed up.

With respect to FIG. 5, whenever user data in the endpoint local memory is modified, the archive flag is again set to "on". This causes a new copy of the user data to be sent to the GW, where it replaces the obsolete backup. The GW acknowledges successful backup, resulting in the archive flag being set again to "off".

With respect to FIG. 4, data recovery is very similar to initial configuration, since the endpoint is being powered up from a state where some, or all internal user data and configurations have been lost due to battery discharging. In the data recovery scenario, a control channel capabilities exchange occurs, as in the initialization scenario, with the exception that the GW indicates it has a data-image (stored data) for this endpoint.

When the endpoint receives a message indicating there is an image available (backup user data), it requests this image from the GW. The GW transfers the backup user data to the endpoint, where the endpoint restores all lost configurations and user data to their state prior to the power failure.

Figure 7A:
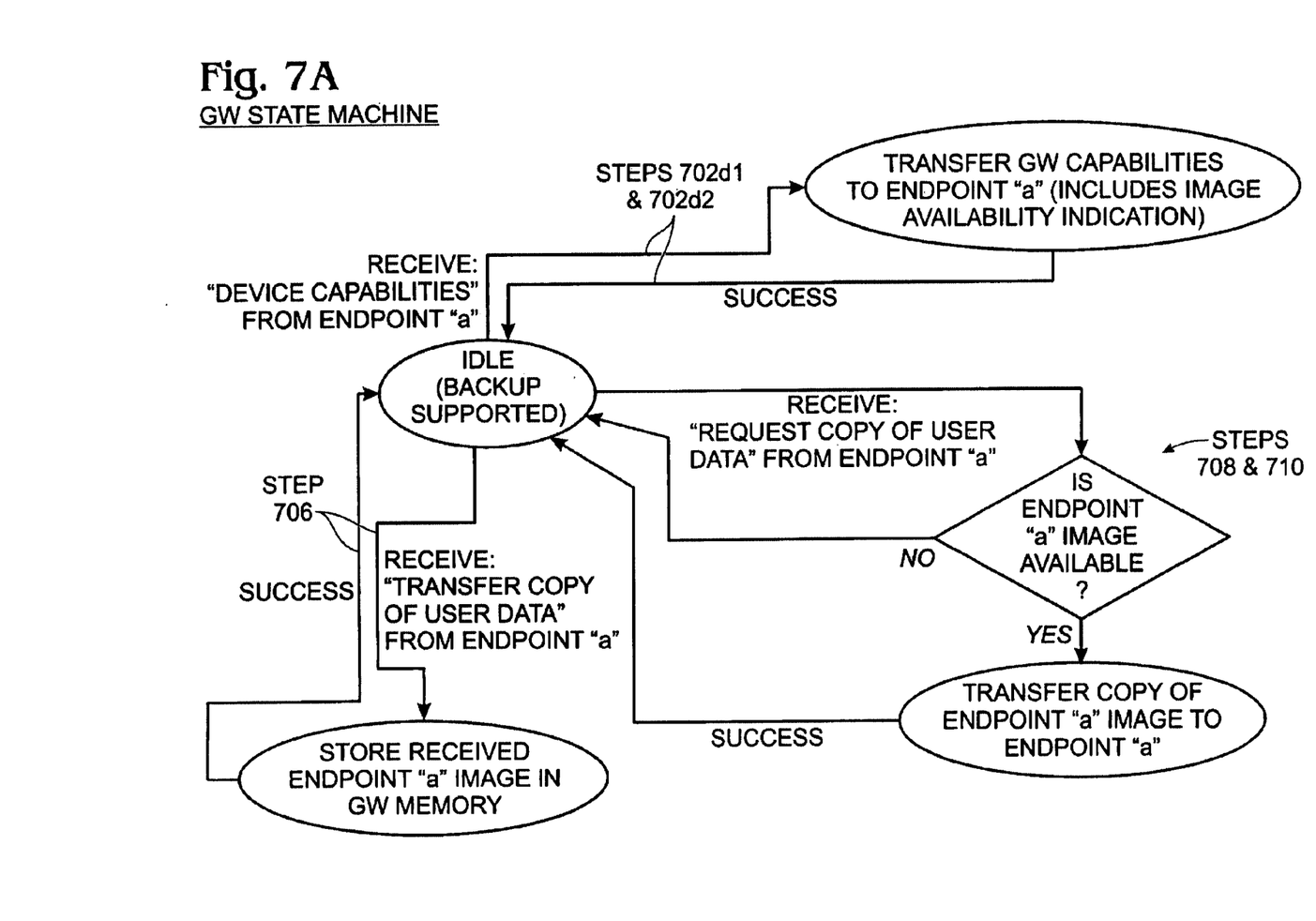
FIGS. 7a through 7c are state machine and flowchart drawings illustrating the operation of the present invention system.
Figure 7B:
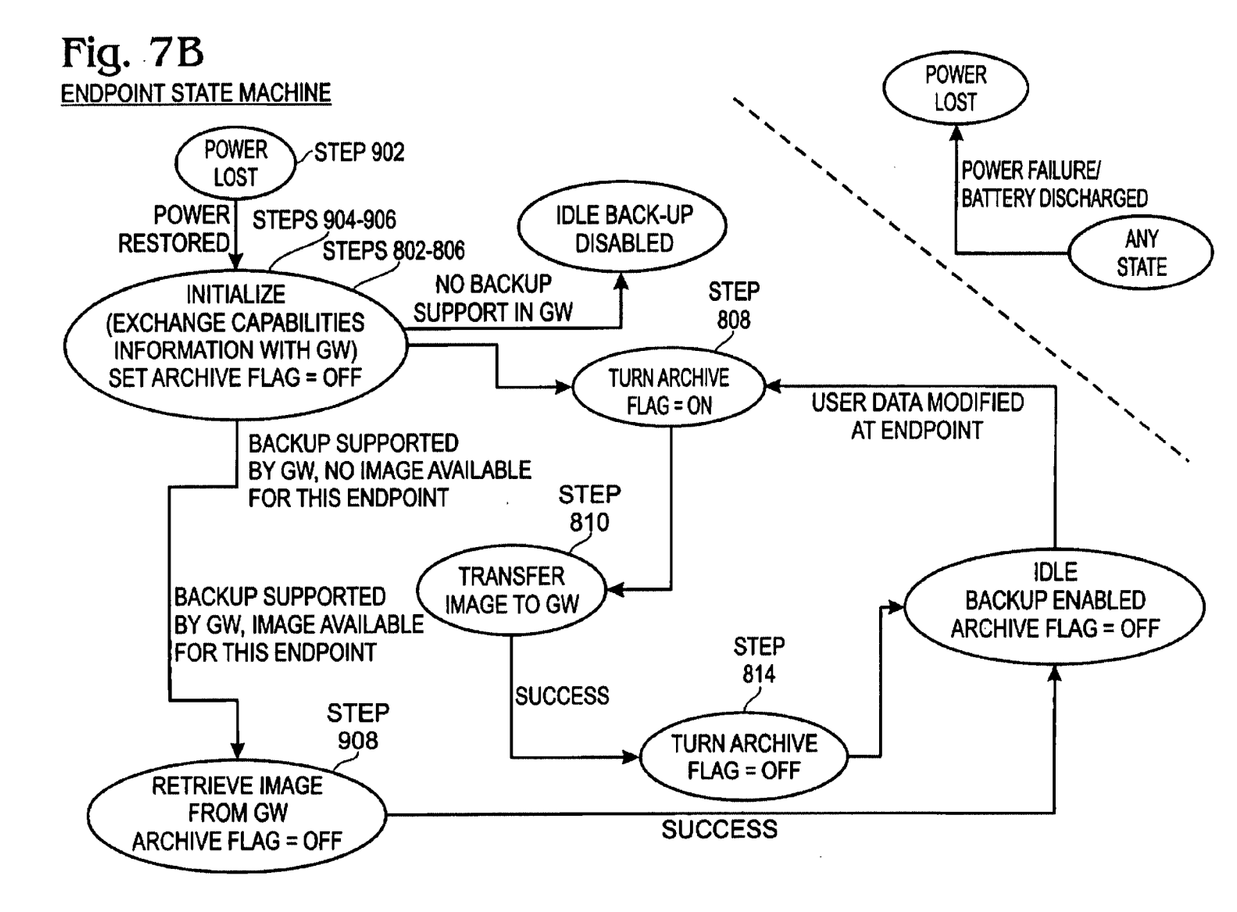
Figure 7C:
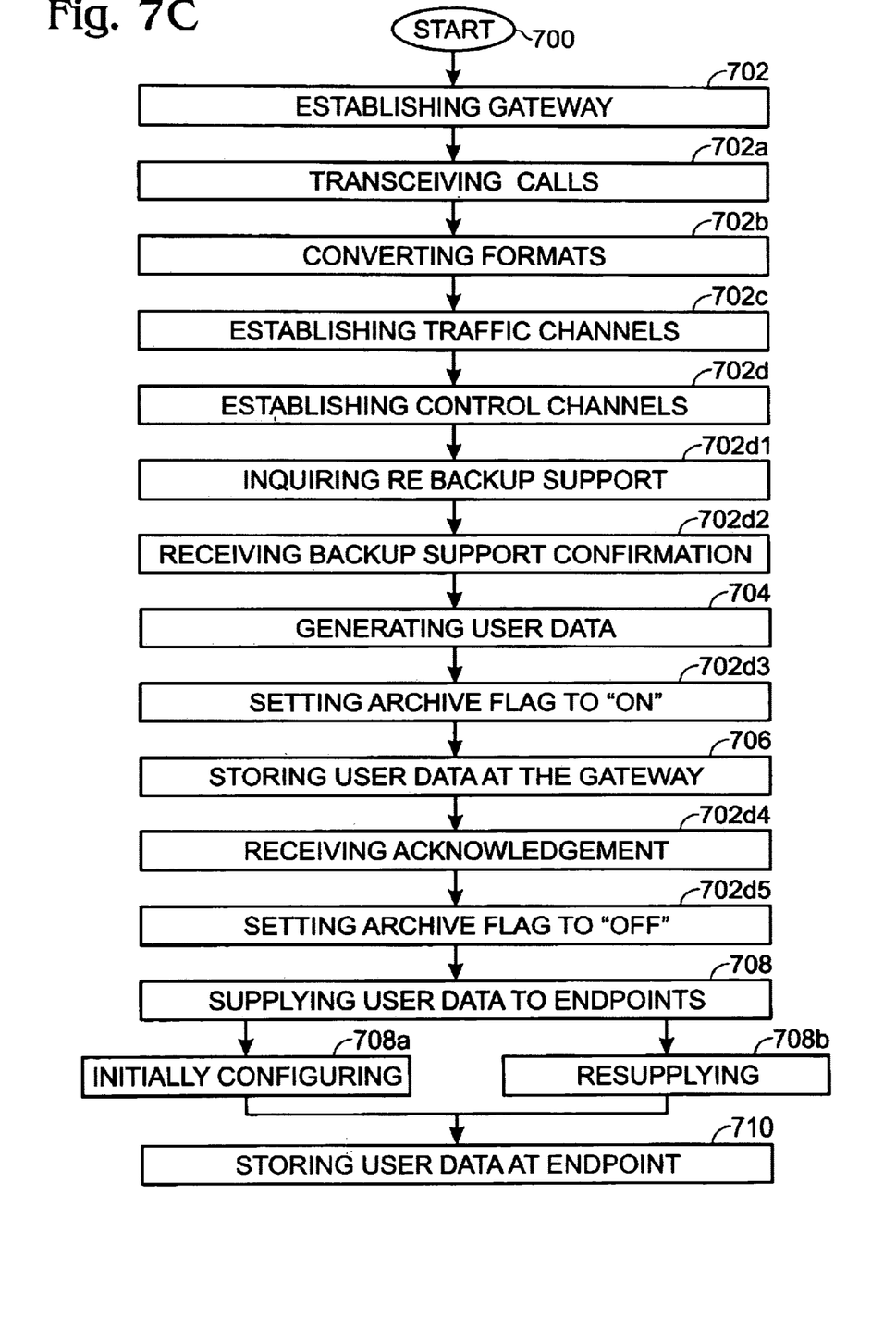

FIGS. 7a through 7c are state machine and flowchart drawings illustrating the operation of the present invention system. Certain states in the state machine drawings are cross-referenced to steps in the flowcharts of FIG. 7c, FIG. 8, and FIG. 9, described below. As seen in the upper-left of FIG. 7a, the gateway is initially at idle and receives communications from an endpoint (endpoint a). The communications give the gateway the endpoint backup capabilities and transfer the gateway's capabilities to the endpoint. The gateway then returns to the idle state.

In a different set of communications, at lower-right part of the figure, the gateway receives a request for backup user data from an endpoint. If the gateway has backup data, the information is transferred to the endpoint. If the gateway has no backup information to transfer, the gateway does nothing and returns to the idle state.

In a different set of control channel communications, in the lower-left part of the figure, the gateway receives a copy of user data from endpoint a, and stores the information as backup user data in memory. Successful communications in the three of the above-mentioned scenarios need not occur as a result of a single instance or attempt. Multiple communications attempts may be required in some circumstances to complete the information completely. In some aspects of the system, the gateway returns to the idle state after a specified number of failed attempts to perform an operation.

In FIG. 7b the endpoint begins from a state of initialization. The initialization state may be reached as a result of the endpoint losing power and, therefore, losing its local memory. If the backup function is not supported by the gateway, the endpoint enters an idle backup disabled state. If backup is supported and the gateway has backup data for the endpoint, the endpoint (with the archive flag to "off") requests the saved image (backup data) from the gateway. If the operation is successful, the endpoint enters an idle backup enabled state. The endpoint turns the archive flag to "on", in response to an initialization condition where the gateway has no backup data stored, or from the backup enabled idle state, after the user data has been modified. In response to the archive flag being turned on, the endpoint transfers data to the gateway, then turns the archive flag to "off", and returns to the idle backup enabled state. Again, the operations of transferring and retrieving images may be as a result of a plurality of communication attempts. In some aspects of the system, the endpoint enters the idle backup disabled state if these above-mentioned states cannot be realized.

FIG. 7c is a flowchart illustrating the present invention method for backing up user data in a Home Network telephone system. Although the method (and the methods described below) is depicted as a sequence of numbered steps for clarity, no order should be inferred from the numbering unless explicitly stated. The method starts at Step 700. Step 702 establishes a gateway to serve at least one Home Network endpoint (typically a plurality of endpoints). Step 704 generates user data at an endpoint, in response to user selected options or in response to a pattern of endpoint use. Step 706 stores a copy of user data associated with each endpoint at the gateway (also see FIG. 7a). In most circumstances, the gateway stores user data generated at the endpoint. The gateway stores user data such as telephone directories, calling line ID (CLID) lists, call-logs, and user preferences for organizing the stored data. In some aspects, the gateway stores the user data in nonvolatile gateway memory. Step 708 supplies the user data to the endpoints. Step 710 locally stores a copy of the user data at the endpoints (also see FIG. 7a).

In some aspects of the method, supplying the user data to the endpoints in Step 708 includes substeps. Step 708a supplies the endpoint with an initial start-up configuration of user data in response to a request from an endpoint that is initializing (as explained in the description of FIG. 3 above). Alternately, Step 708b resupplies the endpoint in response to the endpoint losing the locally stored copy of the user data. The method need not perform both Steps 708a and 708b. In some aspects, both steps are performed.

In some aspects, storing user data associated with each endpoint at the gateway includes substeps. In Step 706a (not shown) each endpoint periodically transmits user data to the gateway for backing up. In Step 706b (not shown) the gateway updates stored user data in response to the periodic transmissions from each endpoint.

Establishing a gateway in Step 702 includes substeps. Step 702a transceives calls on an external telephone line that communicate call information in a first format, typically integrated service digital network (ISDN), plain old phone service (POTS), or VoBB. Step 702b converts between the first format and a digital Home Network format. Step 702c establishes traffic channels to communicate information in the Home Network format. Step 702d establishes a control channel to manage storage and supply of the user data.

In some aspects of the method, establishing a gateway to serve at least one Home Network endpoint in Step 702 includes establishing a unique identifier for each endpoint (for example, see the description of the FIG. 6 MAC addresses). Then, storing user data associated with each endpoint at the gateway in Step 706 includes storing the user data cross-referenced to endpoint identifiers.

Generally, establishing a control channel to manage storage and supply of the user data in Step 702d includes the gateway receiving a copy of the user data at the gateway from an endpoint and sending an acknowledgement from the gateway to the endpoint that the user data has been received. Then, storing a copy of user data associated with each endpoint at the gateway in Step 706 includes storing the user data received from the endpoint. Likewise, establishing a control channel to manage storage and supply of the user data includes an endpoint requesting user data from the gateway, the gateway supplying a copy of the user data to the requesting endpoint, and the endpoint sending an acknowledgement to the gateway that the user data has been received.

In some aspects of the method, establishing a control channel to manage storage and supply of the user data in Step 702d includes substeps. To better illustrate the sequence of events, some of the substeps of Step 702d must be placed out of numeric sequence in the figure, as shown. In Step 702d1 the endpoint inquires if the gateway supports user data backup functions. In Step 702d2, following Step 702d1, the endpoint receives communications from the gateway that the backup function is supported (also see FIG. 7a). Step 702d3 sets an archive flag to the "on" position at the endpoint. This operation follows the generating of user data in Step 704. Storing user data in Step 706 then includes communicating user data to the gateway for backing up. Following Step 706, Step 702d4 receives an acknowledgement from the gateway, and Step 702d5 sets the archive flag to the off position.

In some aspects of the invention, generating user data in Step 704 includes a first endpoint modifying user data. Step 703d3, at the first endpoint, sets an archive flag to the "on" position. Storing user data in Step 706 then includes sending a copy of the modified user data to the gateway from the first endpoint. Step 702d4 sends an acknowledgement from the gateway to the first endpoint that the modified user data has been received.

Figure 8:
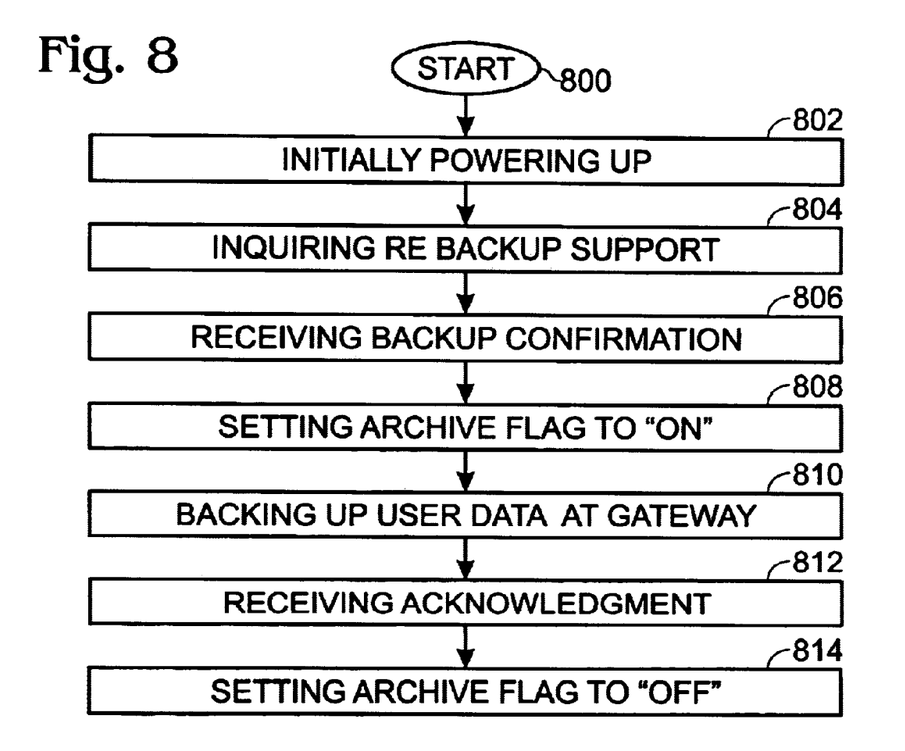
FIG. 8 is a flowchart detailing the present invention method for initial start up.

FIG. 8 is a flowchart detailing the present invention method for initial start up. For the most part, the method of FIG. 8 matches the method of FIG. 7c, and the common details are neither shown nor explained in the interest of brevity. Also, various steps described below are also cross-referenced to the state machine drawing of FIG. 7b. The method starts at Step 800. In Step 802 a first endpoint in initially powering on. In Step 804, which follows Step 802, the first endpoint inquires if the gateway supports user data backup functions. In Step 806 the first endpoint receives communications from the gateway that the backup function is supported, but that no user data is stored for the first endpoint. Note that Step 708a of FIG. 7c describes the situation where user data is stored and available at the gateway. In Step 808 the first endpoint sets an archive flag to the on position. Step 810 communicates first endpoint user data to the gateway for backing up (equivalent to Step 706 of FIG. 7c—storing a copy of user data associated with each endpoint at the gateway). In Step 812 the first endpoint receives an acknowledgement from the gateway. In Step 814 the first endpoint sets the archive flag to the off position.

Figure 9:
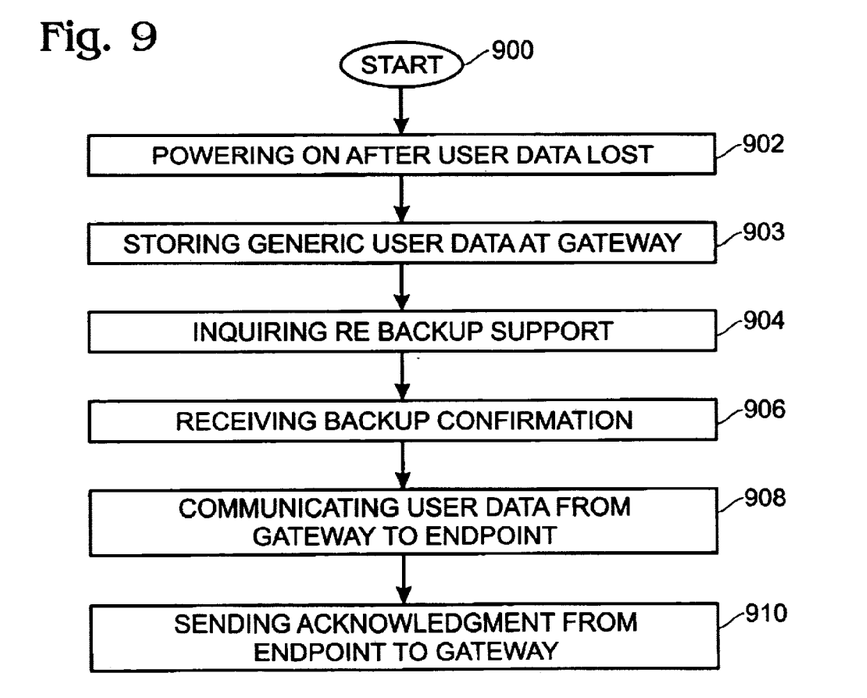
FIG. 9 is a flowchart detailing the present invention method for restoring lost user data.

FIG. 9 is a flowchart detailing the present invention method for restoring lost user data. For the most part, the method of FIG. 9 matches the method of FIG. 7c, and the common details are neither shown nor explained in the interest of brevity. Also, certain steps described below are also cross-referenced in the state machine drawing FIG. 7b. The method starts at Step 900. Step 902 powers on a first endpoint after its locally stored copy of user data has been lost. In Step 904, which follows Step 902, the first endpoint inquires if the gateway supports user data backup functions. In Step 906 the first endpoint receives communications from the gateway that the backup function is supported, and that user data has been stored for the first endpoint. Step 908 communicates the stored user data to the first endpoint from the gateway.

In some aspects of the method a further step, Step 903 stores a generic user data configuration in the gateway memory. Then, communicating the stored user data to the first endpoint from the gateway in Step 908 includes communicating the generic user data configuration.

Alternately stated, a first endpoint loses its locally stored copy of user data in Step 902. The first endpoint requests user data from the gateway in Step 904. The gateway supplies a copy of the user data to the requesting first endpoint in Step 908. In Step 910 the first endpoint sends an acknowledgement to the gateway that the user data has been received.

A system and method have been provided for backing up endpoint user data in a central gateway memory. This invention has been explained in the context of Home Networking cordless telephony devices. These endpoints are more likely to suffer form power loss, due to the use of a rechargeable battery rather than AC power supply. However, other devices also suffer from power loss when there is an AC power outage. These devices could also benefit from the present invention backup system. The invention also described as a system where control channel communications are initiated by the endpoint. Alternate embodiments of the invention could use the gateway to initiate some, or all of the control channel communication events. Other variations and embodiments will occur to those skilled in the art.

I claim:

1. In a Home Network telephone system, a method for backing up user data, the method comprising:

establishing a gateway to serve at least one Home Network endpoint by;

transceiving calls on an external telephone line that communicates call information in a first format;

converting between the first format and a digital Home Network format; and, at the gateway, storing a copy of user data associated with each endpoint selected from the group including telephone directories, calling line ID (CLID) lists, call-logs, and user preferences for organizing the stored data.

2. The method of claim 1 further comprising:

supplying the user data to the endpoints; and, locally storing a copy of the user data at the endpoints.

3. The method of claim 2 wherein supplying the user data to the endpoints is an action selected from the group including:

supplying the endpoint with an initial start-up configuration of user data; and, resupplying the endpoint in response to the endpoint losing the locally stored copy of the user data.

4. The method of claim 3 further comprising:

generating user data at an endpoint; and, wherein storing a copy of user data associated with each endpoint at the gateway includes storing the user data generated at the endpoint.

5. The method of claim 4 wherein establishing a gateway includes:

establishing traffic channels to communicate information in the Home Network format; and, establishing a control channel to manage storage and supply of the user data.

6. The method of claim 5 wherein storing user data associated with each endpoint at the gateway includes storing the user data in nonvolatile gateway memory.

7. The method of claim 5 wherein establishing a gateway to serve at least one Home Network endpoint includes establishing a unique identifier for each endpoint; and, wherein storing user data associated with each endpoint at the gateway includes storing the user data cross-referenced to endpoint identifiers.

8. The method of claim 7 wherein establishing a control channel to manage storage and supply of the user data includes:
the endpoint inquiring if the gateway supports user data backup functions; and,
the endpoint receiving communications from the gateway that the backup function is supported.

9. The method of claim 8 wherein establishing a control channel to manage storage and supply of the user data includes:
at an endpoint, setting an archive flag to the on position;
communicating user data to the gateway for backing up;
receiving an acknowledgement from the gateway; and,
setting the archive flag to the off position.

10. The method of claim 9 further comprising:
initially powering on a first endpoint;
wherein establishing a control channel to manage storage and supply of the user data includes:
following the initial powering, inquiring if the gateway supports user data backup functions;
receiving communications from the gateway that the backup function is supported, but that no user data is stored for the first endpoint; and,
at the first endpoint, setting an archive flag to the on position;
wherein storing a copy of user data associated with each endpoint at the gateway includes communicating first endpoint user data to the gateway for backing up;
wherein establishing a control channel to manage storage and supply of the user data further includes:
receiving an acknowledgement from the gateway; and,
setting the archive flag to the off position.

11. The method of claim 9 further comprising:
powering on a first endpoint after its locally stored copy of user data has been lost;
wherein establishing a control channel to manage storage and supply of the user data includes:
following powering on, inquiring if the gateway supports user data backup functions;
receiving communications from the gateway that the backup function is supported, and that user data has been stored for the first endpoint; and,
wherein supplying the user data to the endpoints includes communicating the stored user data to the first endpoint from the gateway.

12. The method of claim 11 wherein storing user data associated with each endpoint at the gateway includes storing a generic user data configuration in the gateway memory; and,
wherein communicating the stored user data to the first endpoint from the gateway includes communicating the generic user data configuration.

13. The method of claim 9 wherein establishing a control channel to manage storage and supply of the user data includes:
receiving a copy of the user data at the gateway from an endpoint;
sending an acknowledgement from the gateway to the endpoint that the user data has been received; and,
wherein storing a copy of user data associated with each endpoint at the gateway includes storing the user data received from the endpoint.

14. The method of claim 9 wherein generating user data at an endpoint includes modifying user data at a first endpoint;
the method further comprising:
at the first endpoint, setting an archive flag to the on position;
wherein storing a copy of user data associated with each endpoint at the gateway includes sending a copy of the modified user data to the gateway from the first endpoint; and,
the method further comprising:
sending an acknowledgement from the gateway to the first endpoint that the modified user data has been received.

15. The method of claim 8 wherein establishing a control channel to manage storage and supply of the user data includes:
an endpoint requesting user data from the gateway;
the gateway supplying a copy of the user data to the requesting endpoint; and
the endpoint sending an acknowledgement to the gateway that the user data has been received.

16. The method of claim 9 further comprising:
a first endpoint losing its locally stored copy of user data;
the first endpoint requesting user data from the gateway;
the gateway supplying a copy of the user data to the requesting first endpoint; and
the first endpoint sending an acknowledgement to the gateway that the user data has been received.

17. The method of claim 7 wherein storing user data associated with each endpoint at the gateway includes:
each endpoint periodically transmitting user data to the gateway for backing up; and,
the gateway updating stored user data in response to the periodic transmissions from each endpoint.

18. A Home Network telephone system for backing up user data, the system comprising:
at least one endpoint having a port to transceive telephone communications; and,
a gateway having a port on an external telephone line that communicates call information in a first format, the gateway converting between the first format and a digital Home Network format to communicate in the Home Network format with the at least one endpoint, the gateway having a memory to store a copy of user data associated with each endpoint selected from the group including telephone directories, calling line ID (CLID) lists, call-logs, and user preferences for organizing the stored data.

19. The system of claim 18 wherein the gateway supplies the user data to the endpoint; and,
wherein the endpoint receives the user data from the gateway and stores a copy of the user data in a local memory.

20. The system of claim 19 wherein the gateway resupplies the endpoint in response to the endpoint losing the copy of the user data stored in its local memory.

21. The system of claim 20 wherein the endpoint has a user interface to generate user data, the endpoint storing the generated user data in local memory; and,
wherein the gateway stores a back-up copy of the user data generated by the endpoint in the gateway memory.

22. The system of claim 21 wherein the gateway establishes traffic channels to communicate information in the Home Network format, and establishes a control channel to manage storage and supply of the user data.

23. The system of claim 22 wherein the gateway memory is a nonvolatile memory.

24. The system of claim 22 wherein the gateway establishes a unique identifier for each endpoint and stores the user data cross-referenced to endpoint identifiers.

25. The system of claim 24 wherein the endpoint uses the control channel to inquire if the gateway supports user data backup functions; and, wherein the gateway uses the control channel to communicate to the endpoint that the backup function is supported.

26. The system of claim 25 wherein the endpoint uses the control channel to set an archive flag to the on position and communicates user data to the gateway for backup;

wherein the gateway uses the control channel to send an acknowledgement that the user data has been received; and, wherein the endpoint sets the archive flag to the off position in response to receiving the acknowledgement.

27. The system of claim 26 wherein a first endpoint initially powers up and uses a control channel to inquire if the gateway supports user data backup functions;

wherein the gateway uses a control channel to send communications to the endpoint that the backup function is supported, but that no user data is stored for the first endpoint; and, wherein the first endpoint sets an archive flag to the on position, communicates first endpoint user data to the gateway for backup, and sets the archive flag to the off position in response to receiving an acknowledgement from the gateway.

28. The system of claim 26 wherein a first endpoint powers up after its copy of user data stored in local memory has been lost and uses the control channel to inquire if the gateway supports user data backup functions;

wherein the gateway uses the control channel to send communications that the backup function is supported, and that user data has been stored for the first endpoint; and, wherein the first endpoint uses the control channel to receive the stored user data from the gateway and to send an acknowledgement to the gateway.

29. The system of claim 28 wherein the gateway stores a generic user data configuration for the first endpoint in the gateway memory and uses the control channel to communicate the generic user data configuration to the first endpoint.

30. The system of claim 26 wherein the gateway uses the control channel to request a copy of the user data from an endpoint, receives a copy of the user data from the endpoint, sends an acknowledgement to the endpoint that the user data has been received, and stores the user data received from the endpoint.

31. The system of claim 26 wherein a first endpoint modifies the user data, uses a control channel to set an archive flag to the on position, and sends a copy of the modified user data to the gateway; and, wherein the gateway uses the control channel to send an acknowledgement to the first endpoint that the modified user data has been received.

32. The system of claim 26 wherein the endpoint uses the control channel to request user data from the gateway, receives the copy of the user data from the gateway, and sends an acknowledgement to the gateway that the user data has been received.

33. The system of claim 26 wherein a first endpoint loses its copy of user data stored in local memory, uses a control channel to request user data from the gateway, and sends an acknowledgement to the gateway in response to receiving a copy of the user data from the gateway.

34. The system of claim 24 wherein the endpoint periodically transmits user data to the gateway for backing up; and, wherein the gateway updates stored user data in response to the periodic transmissions from the endpoint.

35. The system of claim 18 wherein the endpoint is selected from the group of devices including hardwired devices, wireless devices, telephones, fax machines, video telephones, multifunction peripherals (MFCs), and computers.

36. The system of claim 18 wherein the gateway supplies the endpoint with an initial start-up configuration of user data.

* * * * *